US010634621B2

(12) United States Patent
Kano et al.

(10) Patent No.: US 10,634,621 B2
(45) Date of Patent: Apr. 28, 2020

(54) INFORMATION PROCESSING METHOD, INFORMATION PROCESSING APPARATUS, AND PROGRAM

(71) Applicant: JTEKT CORPORATION, Osaka-shi, Osaka (JP)

(72) Inventors: Masaaki Kano, Obu (JP); Akiyoshi Nakase, Kashiba (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/418,179

(22) Filed: May 21, 2019

(65) Prior Publication Data
US 2019/0360942 A1 Nov. 28, 2019

(30) Foreign Application Priority Data

May 24, 2018 (JP) ................. 2018-099519

(51) Int. Cl.
*G06N 3/08* (2006.01)
*G01N 21/88* (2006.01)
*G06T 7/00* (2017.01)

(52) U.S. Cl.
CPC ........... *G01N 21/8851* (2013.01); *G06N 3/08* (2013.01); *G06T 7/0002* (2013.01); *G01N 2021/8854* (2013.01); *G01N 2021/8883* (2013.01)

(58) Field of Classification Search
CPC ..... G01N 21/8851; G06N 3/08; G06T 7/0002
USPC ..................................................... 356/237.2
See application file for complete search history.

(56) References Cited

U.S. PATENT DOCUMENTS

| | | | |
|---|---|---|---|
| 2016/0155023 A1* | 6/2016 | Uemura | G06K 9/4614 382/224 |
| 2016/0155026 A1* | 6/2016 | Hashiguchi | G06K 9/6267 |
| 2017/0147909 A1* | 5/2017 | Izumi | G06K 9/6262 |
| 2017/0330315 A1* | 11/2017 | Okuda | G01N 21/8851 |

FOREIGN PATENT DOCUMENTS

JP 2010-140444 A 6/2010

* cited by examiner

*Primary Examiner* — Hung Nguyen
(74) *Attorney, Agent, or Firm* — Oliff PLC

(57) ABSTRACT

A learning procedure involves generating a non-defective product learning model by conducting machine learning using non-defective product data as teacher data, and generating a defective product learning model for each defect type by conducting machine learning for each defect type using defective product data as teacher data. A calculating procedure involves calculating the likelihood of a non-defective product from output data calculated using the non-defective product learning model to which target product data is input, and calculating the likelihood of a defective product for each defect type from output data calculated using the defective product learning model to which the target product data is input. A determining procedure involves determining that the target product data is data on a defective product having an unknown defect when the likelihood of a non-defective product and the likelihood of a defective product for each defect type satisfy a predetermined requirement.

11 Claims, 6 Drawing Sheets

[SPACE FOR DETERMINATION OF NON-DEFECTIVE PRODUCT]

(BOUNDARY FOR DETERMINATION OF NON-DEFECTIVE PRODUCT)L0

[SPACE FOR DETERMINATION OF DEFECT 1]

(BOUNDARY FOR DETERMINATION OF DEFECT 1)L1

[SPACE FOR DETERMINATION OF DEFECT n]

(BOUNDARY FOR DETERMINATION OF DEFECT n)Ln

INFORMATION PROCESSING METHOD, INFORMATION PROCESSING APPARATUS, AND PROGRAM

INCORPORATION BY REFERENCE

The disclosure of Japanese Patent Application No. 2018-099519 filed on May 24, 2018, including the specification, drawings and abstract, is incorporated herein by reference in its entirety.

BACKGROUND OF THE INVENTION

1. Field of the Invention

The invention relates to information processing methods, information processing apparatuses, and programs.

2. Description of the Related Art

An information processing technique known in the related art involves making determinations and classifications using computer-based machine learning. An example of such a technique involves determining whether each product produced is non-defective or defective so as to classify the products. A common technique to make determinations using a computer first involves generating a learning model by conducting machine learning using, as teacher data, non-defective product data and defective product data obtained in advance. Products may suffer various types (or kinds) of defects. This makes it necessary to use, as teacher data, defective product data for each defect type in order to make a determination for each defect type. FIG. 6 is a conceptual diagram illustrating spaces that represent the features of non-defective product data and defective product data for each defect type. As illustrated in FIG. 6, determination boundaries are defined between the spaces representing the features of the non-defective product data and the defective product data for each defect type so as to group the non-defective product data and the defective product data, for each defect type. The following description is based on the assumption that the defect types include a "defect 1", a "defect 2", and a "defect 3".

When product data to be inspected is obtained, the product data is input to the generated learning model in the form of input data. The product data is thus classified into groups according to feature similarity such that each group includes the product data having highly similar features. Referring to the conceptual diagram of FIG. 6, such classification involves determining to which of areas or groups (which are defined by the determination boundaries) the product data to be inspected belongs. Japanese Patent Application Publication No. 2010-140444 (JP 2010-140444 A) discloses a technique to conduct machine learning and make determinations using a computer.

FIG. 6, the defect types for the defective product data include the "defect 1", the "defect 2", and the "defect 3", and the defective product data has different features according to defect type. As previously mentioned, the information processing method known in the related art involves defining, the determination boundaries between the spaces representing the features of the non-defective product data and the defective product data for each defect type. In other words, the determination boundaries define the spaces each including the product data having highly similar features. As indicated by, for example, the arrow E in FIG. 6, the features of the target product data may straddle a boundary B1 between the space of the defect 1 and the space of the non-defective product data. In this case, the product data having such features is determined to be either defective product data having the defect 1 or non-defective product data.

If the product data having the features indicated by the arrow E is determined to be defective product data of a new (or unknown) defect type different from the defect 1, however, this determination is inaccurate. Suppose that although the target product data is actually defective product data, the features of this data are more similar to the features of the non-defective product data than to the features of the defective product data having the known defect 1. In such a case, the information processing method known in the related art unfortunately determines that this defective product data is non-defective product data.

SUMMARY OF THE INVENTION

An object of the invention is to provide an information processing method, an information processing apparatus, and a program that are able to, when target product data includes data on a defective product having an unknown defect, determine that this data is data on a defective product having an unknown defect.

An information processing method according to an aspect of the invention includes a learning procedure, a calculating procedure, and a determining procedure. The learning procedure involves generating a non-defective product learning model by conducting machine learning using non-defective product data as teacher data, and generating a defective product learning model for each defect type by conducting machine learning for each defect type using defective product data as teacher data. The calculating procedure involves calculating a likelihood of a non-defective product from output data calculated using the non-defective product learning model to which target product data is input, and calculating a likelihood of a defective product for each defect type from output data calculated using the defective product learning model to which the target product data is input. The determining procedure involves determining that the target product data is data on a defective product having an unknown defect when the likelihood of a non-defective product and the likelihood of a defective product for each defect type calculated by the calculating procedure satisfy a likelihood-related predetermined requirement.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
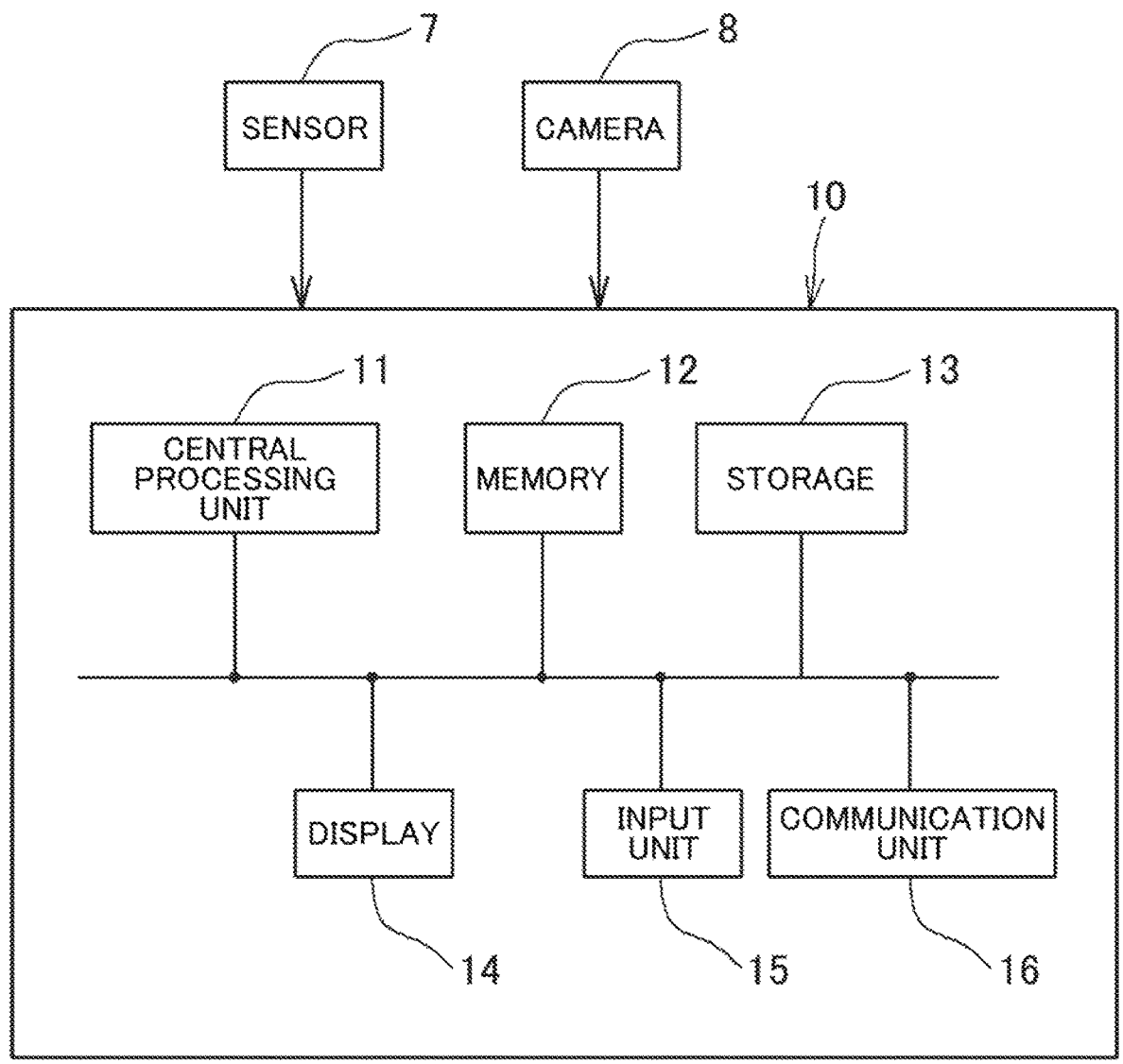
FIG. 1 is a block diagram schematically illustrating an exemplary hardware configuration of an information processing apparatus.

FIG. 1 is a block diagram schematically illustrating an exemplary hardware configuration of an information processing apparatus 10 according to an embodiment of the invention. The information processing apparatus 10 according to the present embodiment is used in an inspection step of a production line for products. Examples of the products include not only a component such as a bearing ring for a rolling bearing but also an assembly made up of a plurality of components. Examples of such an assembly include a steering system (such as an electric power steering system) and a rolling bearing.

When the products are assemblies, the inspection step involves operating (or rotating) each product and measuring vibrations (or sounds) of each product using a sensor 7 brought into contact with a portion of the product. The information processing apparatus 10 receives data resulting from the measurements made by the sensor 7 in the form of product data. Irrespective of whether the products are components or assemblies, the inspection step may involve capturing an image of each product with a camera 8 so as to conduct a visual inspection. In this case, the information processing apparatus 10 receives data of images captured with the camera 8 in the form of product data. Product data may thus be vibration data or image data (e.g., external image data). Alternatively, product data may be processed data provided by processing vibration data (which is raw data) obtained using the sensor 7 or processed data provided by processing image data (which is raw data) obtained using the camera 8. Examples of such processed data include frequency data generated by conducting an analysis (e.g., a Fourier analysis) on vibration data that is time series data obtained using the sensor 7. Alternatively, the processed data may be image analysis data obtained by conducting an image analysis on data of captured images. The use of vibration data enables the information processing apparatus 10 to conduct an operational inspection on the products. The use of image data enables the information processing apparatus 10 to conduct a visual inspection on the products.

The information processing apparatus 10 has the function of determining whether each product produced in the production line is non-defective or defective, determining a defect type (or category) for each defective product, and determining unknown defect(s). The following description is based on the assumption that the products are steering systems, and vibration data is used as product data. Examples of defect types in this case include a defect in a specific gear portion and a defect in a specific bearing portion. Operating steering systems having such defects induces vibrations having different frequency components. Because the frequency components have characteristics, the information processing apparatus 10 is able to determine the defect type on the basis of the characteristics of the frequency components. When image data is used as product data, shades resulting from a flaw, for example, are convened into data, and the information processing apparatus 10 is able to determine the defect type on the basis of this data.

The configuration of the information processing apparatus 10 will be described. The information processing apparatus 10 includes a central processing unit (CPU) 11, a memory 12, a storage 13, a display 14, an input unit 15, and a communication unit 16. The memory 12 includes a read-only memory (ROM) and a random-access memory (RAM). The storage 13 includes a hard disk drive. The CPU 11 reads a program (e.g., a computer program) stored in the memory 12 or the storage 13 so as to execute various processes. The storage 13 stores various pieces of information, such as data received from the sensor 7, data (i.e., product data) obtained by processing the data received from the sensor 7, various threshold values, learning models (which will be described below), and the program. The information processing apparatus 10 includes various functional units (which will be described below). The CPU 11 reads the program stored in the memory 12 or the storage 13 and executes the program so as to cause each functional unit to perform its function.

Information processing carried out by the information processing apparatus 10 enables an inspection of the products (e.g., steering systems). An inspection of the products (i.e., an inspection step) is included in the production line to produce the products. Product data obtained for non-defective products will be referred to as "non-defective product data". Product data obtained for defective products will be referred to as "defective product data". The products may have various types (or kinds) of defects. To distinguish among a plurality of known defect types, the defect types will hereinafter be sequentially numbered as follows: a defect 1, a defect 2, . . . , and a defect n (where n is an integer). In this case, the number of defect types is n. Each of the defect 1, the defect 2, . . . , and the defect n is a known defect. In the course of production of the products, "unknown defects" other than the known defects may occur. The known defects are defects on which machine learning is conducted by the information processing apparatus 10 as described below, but the unknown defects are defects on which no machine learning is conducted by the information processing apparatus 10.

Figure 2:
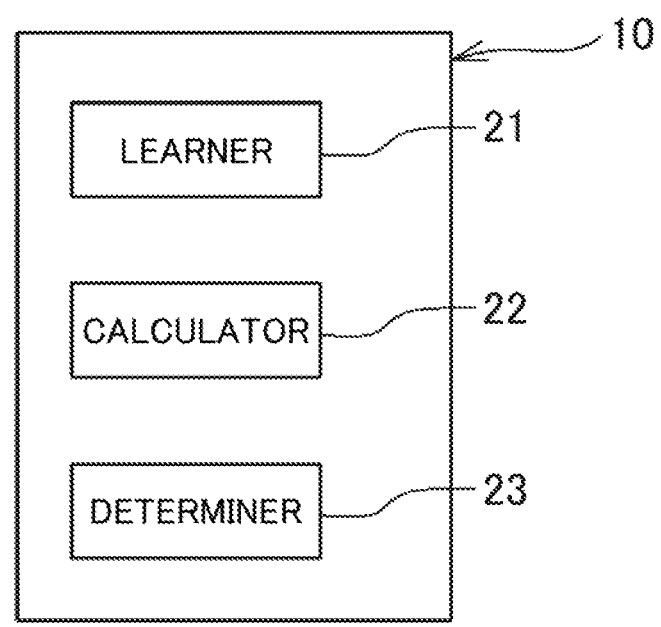
FIG. 2 is a diagram illustrating a software configuration of the information processing apparatus.

FIG. 2 is a diagram illustrating a software configuration of the information processing apparatus 10. The functional units of the information processing apparatus 10 include a learner 21, a calculator 22, and a determiner 23. As previously mentioned, the CPU 11 executes the program so as to cause each of these functional units to perform its function. Specifically, the program is a program to cause a computer to function as the learner 21, the calculator 22, and the determiner 23. The program may be stored in any of various storage media. These functional units will be described below.

The learner 21 has the function of generating learning models. The learner 21 conducts machine learning so as to generate a non-defective product learning model and defective product learning models different from the non-defective product learning model. In the present embodiment, the number of known defects is two or more as previously mentioned. The learner 21 thus generates the defective product learning model for each defect type. For example, suppose that the number of known defects, is three (i.e., suppose that the known defects are the defect 1, the defect 2, and the defect 3). In this case, the learner 21 generates three defective product learning models (i.e., a defective product learning model M1, a defective product learning model M2, and a defective product learning model M3). When n is an integer equal to or greater than one, the defective product learning model for the defect n will be referred to as a "defective product learning model Mn".

To generate the non-defective product learning model, the learner 21 conducts machine learning using non-defective product data as teacher data. To generate the defective product learning model Mn (n is an integer) for each defect type, the learner 21 conducts, for each defect type, machine learning using defective product data as teacher data. Information on "non-defective product labels" each provided in the form of a teacher label is associated with (or attached to) the non-defective product data used in machine learning for the generation of the non-defective product learning model. Information on "defective product labels" each provided in the form of a teacher label is associated with (or attached to) the defective product data used in machine learning for the generation of the defective product learning models. The defective product labels differ for each defect type and are each associated with the defective product data.

An algorithm by which the learner 21 conducts machine learning defective product learning) using, as teacher data, defective product data for each defect type is identical to an algorithm by which the learner 21 conducts machine learning (i.e., non-defective product learning) using non-defective product data as teacher data. Accordingly, the learner 21 generates the non-detective product learning model based on the non-defective product data, and generates, for each defect type, the defective product learning model based on the defective product data.

Examples of a learning model to be used by the learner 21 include a variational auto-encoder (VAE). Non-defective product data is input to the VAE learning model, and learning is conducted so as to generate the non-defective product learning model including parameters by which non-defective products are learned. The non-defective product learning model learns so as to provide, upon receiving non-defective product data, an output that reproduces the non-defective product data. Defective product data for each defect type is input to the VAE learning model, and learning is conducted so as to generate the defective product learning models including parameters by which defective products are learned. Thus, the learner 21 generates the non-defective product learning model by conducting machine learning using non-defective product data as teacher data, and generates the defective product learning model for each defect type by conducting machine learning for each defect type using defective product data as teacher data. The non-defective product learning model generated and the defective product learning model generated for each defect type are stored in the storage 13.

Figure 3:
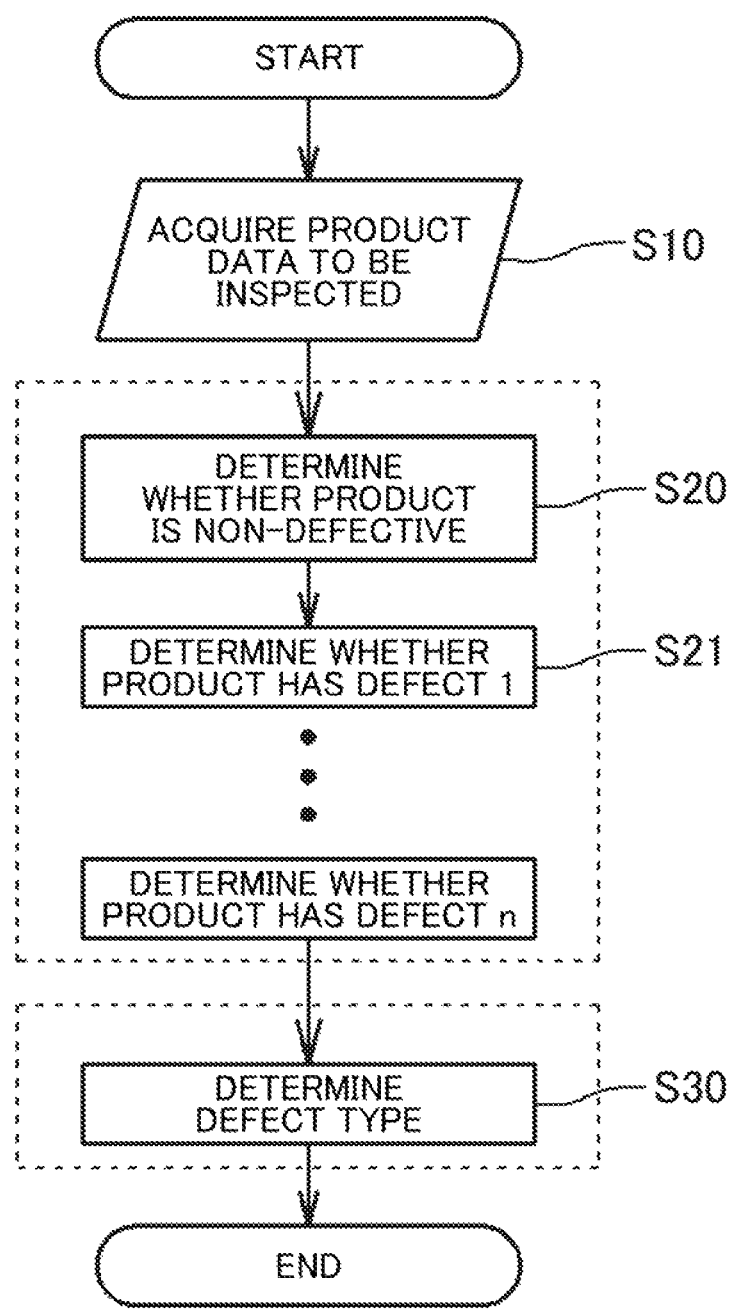
FIG. 3 is a flow chart schematically illustrating processing steps to be performed by a calculator and a determiner.

FIG. 3 is a flow chart schematically illustrating processing steps to be performed by the calculator 22 and the determiner 23. When the products are produced from the production line, an inspection step will be carried out. The inspection step involves acquiring data on the products (i.e., product data) using the sensor 7 (see FIG. 1). This process corresponds to step S10 in FIG. 3. The product data to be inspected is sequentially stored in the storage 13 of the information processing apparatus 10. The calculator 22 inputs each piece of the product data to all of the learning models generated by the learner 21 (e.g., the non-defective product learning model and the defective product learning model for each defect type) so as to acquire output data provided from each learning model. In accordance with the output data, the determiner 23 performs the process of determining whether each piece of the product data corresponds to a non-defective product or corresponds to any one of the defect 1, . . . , and the defect n. This process will be referred to as an "individual determining process". The individual determining process corresponds to step S20, step S21 . . . in FIG. 3. In accordance with the results of the individual determining process, the determiner 23 further performs the process of determining whether the target product data corresponds to a non-defective product, corresponds to any one of the known defect 1, . . . , and defect n, or corresponds to an unknown defect. This process corresponds to step S30 in FIG. 3.

Specific examples of processes to be performed by the calculator 22 will be described. The calculator 22 calculates a determination value that is a difference between the product data (which is input data) and the output data. The difference is a mean square error. In the present embodiment, data on the defect 1 is input to the defective product learning model M1 for the defect 1, and then the defective product learning model M1 outputs data that reproduces the data on the defect 1. The determination value is thus small when the data on the defect 1 is input to the defective product learning model M1. Suppose that data other than the data on the defect 1 (e.g., data on the defect 2) is input to the defective product learning model M1. In this case, the determination value is larger than that calculated when the data on the detect I is input to the defective product learning model M1. The calculator 22 converts the calculated determination value into a likelihood. The likelihood is an indicator of a probability. The likelihood of the defect 1, for example, is an indicator of the "probability of being the defect 1". The likelihood of the defect 1 is thus high when the determination value for the defect 1 (or the error) is small. Accordingly, when the determination value for product data input to the defective product learning model Mn for the defect n is small (i.e., when the likelihood of the defect n is high), the product data is estimated to be data on a defective product having the defect n. When the determination value for product data input to the non-defective product learning model is small (i.e., when the likelihood of a non-defective product is high), the product data is estimated to be non-defective product data.

The calculator 22 thus calculates the likelihood of a non-defective product from output data calculated using the non-defective product learning model to which target product data is input. The calculator 22 further calculates, for each defect type, the likelihood of a defective product from output data calculated using the associated defective product learning model Mn (n is an integer) to which the target product data is input. The likelihoods (or determination values) calculated are stored in the storage 13 such that the likelihoods (or determination values) are classified according to learning model used.

The processes to be performed by the determiner 23 will be described. The determiner 23 makes a comparison between the likelihood of a non-detective product calculated for the target product data by the calculator 22 and a threshold value for non-defective products. The determiner 23 further has the function of performing the process of making a comparison between the likelihood of a known defect (such as the defect 1, the defect 2, . . . , and the defect n) for the product data and a threshold value for this known defect. The determiner 23 further has the function of determining, in accordance with the results of these comparison processes, whether the product data is non-defective product data, known defective product data, or unknown defective product data. Upon determining that the product data is known defective product data, the determiner 23 determines the detect type for this known defective product data. The threshold values are set in advance. The threshold value for non-defective products may be different from or the same as the threshold values for defective products. The threshold values for defects may differ for each defect type or the same threshold value may be used for all defect types. When the likelihood of the defect n is greater than the threshold value for the defect n (i.e., when the determination value for the defect n is small) for the product data, the determiner 23 is able to determine (or estimate) that the product data may he data on the defect n.

The determiner 23 thus determines whether the likelihood of a non-defective product and the likelihood of a defective product for each defect type, calculated by the calculator 22, satisfy a likelihood-related predetermined requirement. In one example (which will be described below), the determiner 23 determines that the target product data is data on a defective product having an unknown defect when the likelihood of a non-defective product and the likelihood of a defective product for each defect type, calculated by the calculator 22, satisfy the likelihood-related "predetermined requirement". As used herein, the term "predetermined requirement" refers to a requirement that the likelihoods of a defective product for all defects must each be lower than the associated defective product threshold value as a result of the comparison between the likelihood and the threshold value for each defect type, and the likelihood of a non-defective product must be lower than the non-defective product threshold value. The processes to be performed by the determiner 23 will be described in more detail in relation to an information processing method described below.

The information processing method to be performed by the information processing apparatus 10 configured as described above will be described with reference to FIG. 4. The information processing method first involves performing a learning procedure and then involves performing a calculating procedure and a determining procedure. in the learning procedure, the learner 21 conducts machine learning. In the calculating procedure, the calculator 22 performs calculations in accordance with the results of machine learning. In the determining procedure, the determiner 23 makes determinations in accordance with the results of machine learning.

Figure 4:
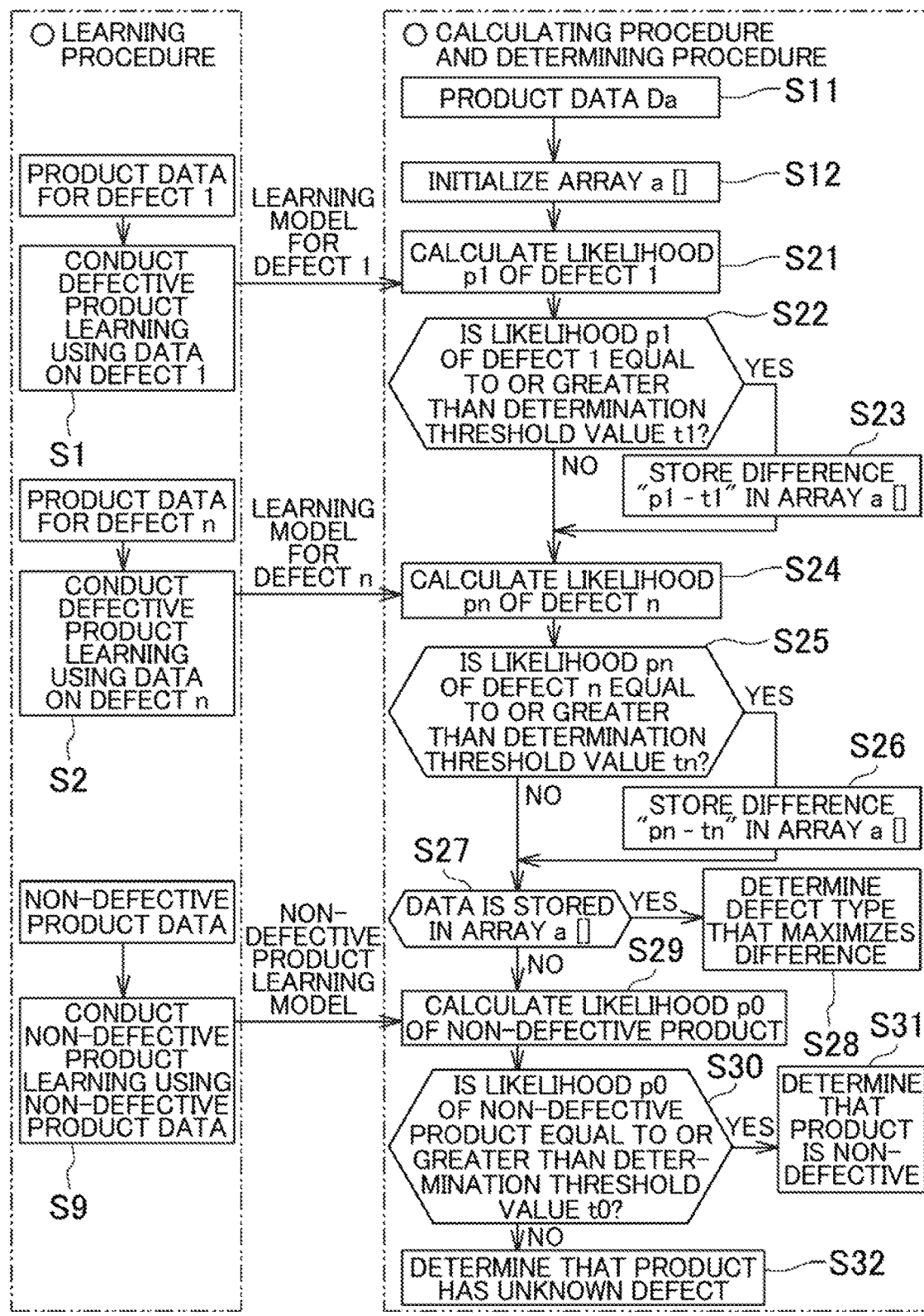
FIG. 4 is a flow chart of an information processing method.

Machine learning to be conducted by the learner 21 will be described. In step S1 in FIG. 4, the learner 21 generates the defective product learning model M1 by conducting machine learning on product data (e.g., defective product data for the defect 1) using a defective product label for the defect 1 as a teacher label. Such a defective product learning model generating process is performed repeatedly (e.g., n times) such that the defective product learning model is generated for each of the known defects. Step S2 in FIG. 4 thus involves performing such a defective product learning model generating process for each of the defect types so as to generate the defective product learning model for each defect type. In step S9 in FIG. 4, the learner 21 generates a non-defective product learning model by conducting machine learning on product data (i.e., non-defective product data) using a non-defective product label as a teacher label. Performing this learning procedure generates the defective product learning model for each defect type (i.e., the n detective product learning models) and the single non-defective product learning model. The procedure including step S1, step S2, and step S9 in FIG. 4 is the learning procedure. The teacher labels are extracted and associated with product data by an operator.

The information processing method involves performing step S11 after the products are produced from the production line. In step S11, product data Da is obtained for each product using, for example, the sensor 7 (see FIG. 1). The memory 12 or the storage 13 of the information processing apparatus 10 includes a storage area where data (or data constellation) is to be stored. In step S12, the storage area is initialized When the calculator 22 receives a single piece of product data to be processed. in FIG. 4, the storage area is represented as "ARRAY a [ ]". In the following description, the storage area is defined as an array a [ ].

The calculator 22 inputs the product data Da (which is to be processed) to an arithmetic algorithm that uses the defective product learning model M1 for the defect 1 generated by the learner 21, so that the calculator 22 acquires output data from the arithmetic algorithm. In step S21, the calculator 22 calculates, for the product data Da, a likelihood p1 of the defect 1 in accordance with the output data. The processes described below are performed by the calculator 22 unless otherwise specified. In the present embodiment, the calculator 22 calculates a difference between the input product data Da and the output data so as to define this difference as a determination value. The determination value is converted into the likelihood p1 of the defect 1. In step S22, the determiner 23 makes a comparison between the likelihood p1 of the defect 1 and a threshold value t1 for the defect 1. When the result of the comparison indicates that the likelihood p1 of the defect 1 is equal to or greater than the threshold value t1 (i.e., when the answer is "YES" in step S22), the determiner 23 stores the difference between the likelihood p1 and the threshold value t1 (which is represented as "p1−t1") in the array a [ ] in step S23. When the result of the comparison indicates that the likelihood p1 of the defect 1 is lower than the threshold value t1 (i.e., when the answer is "NO" in step S22), no data is stored in the array a [ ]. The procedure then goes to the next step (i.e., step S24).

The processes described above are performed for each defect type. The calculator 22 inputs the product data Da (which is to be processed) to an arithmetic algorithm that uses the defective product learning model Mn for the defect n generated by the learner 21, so that the calculator 22 acquires output data from the arithmetic algorithm. In step S24, the calculator 22 calculates, for the product data Da, a likelihood pn of the defect n in, accordance with the output data. The calculator 22 further calculates a difference between the input product data Da and the output data so as to define this difference as a determination value. The determination value is converted into the likelihood pn of the defect n. In step S25, the determiner 23 makes a comparison between the likelihood pn of the defect n and a threshold value tn for the defect n. When the result of the comparison indicates that the likelihood pn of the defect n is equal to or greater than the threshold value tn (i.e., when the answer is "YES" in step S25), the determiner 23 stores the difference between the likelihood pn and the threshold value tn (which is represented as "pn−tn") in the array a [ ] in step S26. When the result of the comparison indicates that the likelihood pn of the defect n is lower than the threshold value tn (i.e., when the answer is "NO" in step S25), no data is stored in the array a [ ]. The procedure then goes to the next step.

After the product data Da is processed for all of the defect types, the determiner 23 determines whether any data is stored in the array a [ ] in step S27. When data is stored in the array a [ ] (i.e., when the answer is "YES" in step S27), the determiner 23 extracts, from the array a [ ],the defect type that maximizes the difference. In step S28, the determiner 23 determines that the extracted defect type is the defect type for the product data Da to be processed.

When no data is stored in the array a [ ] (i.e., when the answer is "NO" in step S27), the procedure goes to the next step (i.e., step S29). In step S29, the calculator 22 inputs the product data Da (which is to be processed) to an arithmetic algorithm that uses the non-defective product learning model generated by the learner 21, so that the calculator 22 acquires output data from the arithmetic algorithm. In step S29, the calculator 22 calculates a likelihood p0 of a non-defective product in accordance with the output data. The processes described below are performed by the calculator 22 unless otherwise specified. In the present embodiment, the calculator 22 calculates a difference between the input product data Da and the output data so as to define this difference as a determination value. The determination value is converted into the likelihood p0 of a non-defective product. In step S30, the determiner 23 makes a comparison between the likelihood p0 of a non-defective product and a threshold value t0 for a non-defective product. When the result of the comparison indicates that the likelihood p0 of a non-defective product is equal to or greater than the threshold value t0 (i.e., when the answer is "YES" in step S30), the determiner 23 determines in step S31 that the target product data Da is non-defective product data. When the result of the comparison indicates that the likelihood p0 of a non-defective product is lower than the threshold value t0 (i.e., when the answer is "NO" in step S30), the determiner 23 determines in step S32 that the target product data Da is unknown defective product data.

The determiner 23 thus determines in step S32 that the target product data Da is data on a defective product having an unknown defect when no data is stored in the array a [ ] (which means that the answer is "NO" in step S27), the likelihoods of a defective product for all defects are each lower than the associated defective product threshold value, and the likelihood p0 of a non-defective product is lower than the threshold value t0 (which means that the answer is "NO" in step S30).

As described above, the information processing method according to the present embodiment includes the learning procedure, the calculating procedure, and the determining procedure. The calculating procedure and the determining procedure are performed for each piece of product data and are thus carried out repeatedly.

The learning procedure involves generating, in step S9 in FIG. 4, the non-defective product learning model by conducting machine learning using non-defective product data as teacher data, and generating, in steps S1 and S2 in FIG. 4, the defective product learning model for each defect type by conducting machine learning for each defect type using defective product data as teacher data. The learning procedure is performed by the learner 21.

The calculating procedure involves calculating, in step S29, the likelihood p0 of a non-defective product from output data calculated using the non-defective product learning model to which the target product data Da is input, and calculating, in steps 521 and S24, the likelihood (p1, ... pn) of a defective product for each defect type from output data calculated using the defective product learning model to which the target product data Da is input. The calculating procedure is performed by the calculator 22.

In the present embodiment, the determining procedure involves making a comparison between the likelihood p0 of a non-defective product and the non-defective product threshold value t0 in step S30, and making a comparison between the likelihood (p1, ... pn) of a defective product and the defective product threshold value (t1, ... tn) for each defect type in steps S22 and S25. Unlike the flow chart illustrated in FIG. 4, a comparison may be made between the likelihood (p1, ... pn) of a defective product and the threshold value (t1, ..., tn) after a comparison is made between the likelihood p0 of a non-defective product and the threshold value t0. In the present embodiment, however, a comparison is preferably made between the likelihood p0 of a non-defective product and the threshold value t0 after a comparison is made between the likelihood (p1, ..., pn) of a defective product and the threshold value (t1, ..., tn) for each defect type as indicated by the flow chart illustrated in FIG. 4. The determining procedure is performed by the determiner 23.

The determining procedure involves determining in step S32 that the target product data Da is data on a defective product having an unknown defect when the likelihood p0 of a non-defective product and the likelihood (p1, ..., pn) of a defective product for each defect type, calculated by the calculating procedure, satisfy the likelihood-related "predetermined requirement". Specifically, the present embodiment involves making a comparison between the likelihood (p1, ..., pn) of a defective product and the defective product threshold value (t1, ..., tn) for each detect type in steps S22 and S25, and making a comparison between the likelihood p0 of a non-defective product and the non-defective product threshold value t0 in step S30. The determiner 23 determines in step S32 that the target product data Da is data on a defective product having an unknown defect when the likelihoods (p1, ..., pn) of a defective product for all defects are each lower than the associated defective product threshold value (t1, ..., tn) as a result of the comparison for each defect type, and the likelihood p0 of a non-defective product is lower than the non-defective product threshold value t0. As used herein, the term "predetermined requirement" refers to a requirement that the likelihoods (p1, ..., pn) of a defective product for all defects must each be lower than the associated defective product threshold value (t1, ..., tn) as a result of the comparison for each defect type, and the likelihood p0 of a non-defective product must be lower than the non-defective product threshold value t0.

When the likelihoods (p1, ..., pn) of a defective product for all defects are each lower than the associated defective product threshold value (t1, ..., tn) as a result of the comparison for each defect type, the target product data Da is unlikely to be data on a defective product having a known defect. When the likelihood p0 of a non-defective product is lower than the non-defective product threshold value t0, the target product data Da is unlikely to be data on a non-defective product. The determiner 23 is thus able to determine that the target product data Da is data on a defective product having an unknown defect when the predetermined requirement is satisfied.

When the result of the comparison for each defect type indicates that the likelihoods of defective products are equal to or greater than the defective product threshold values for a plurality of defect types, e.g., the defect 1 and the defect n (i.e., when p1≥t1 and pn≥tn, which means that the answer is "YES" in step S22 and step S25), the determining procedure involves determining that one of the plurality of defect types that maximizes the difference between the likelihood and the defective product threshold value is the defect type for the target product data Da. For example, assume that the difference between the likelihood p1 of the defect 1 and the associated threshold value t1 (which is represented as p1−t1) is α, and the difference between the likelihood pn of the defect n and the associated threshold value tn (which is represented as pn−tn) is β. In this case, when α is greater than β, the determiner 23 determines that the target product data Da is defective product data, and the defect type is the "defect 1". The determiner 23 determines that the defect type is the "defect 1" because the difference (p1−t1) is stored in the array a [ ] land the difference (p1−t1) is the maximum difference.

When the likelihoods of a defective product for defects are equal to or greater than the defective product threshold values and one of a plurality of defect types maximizes the difference between the likelihood and the defective product threshold value, this defect type is the most likely defect type. Accordingly, the determiner 23 would be able to determine the single most likely defect type if the likelihoods of defective products are equal to or greater than the defective product threshold values for a plurality of defect types (e.g., if $p1 \geq t1$ and $pn \geq tn$).

When the result of the comparison for each defect type in steps S22 and S25 indicates that the likelihood of a defective product for one of the defect types is equal to or greater than the associated defective product threshold value, the determining procedure involves determining that the target product data Da is data on a defective product having this defect type. For example, suppose that the likelihood p1 of the defect 1 is equal to or greater than the associated threshold value t1 (which means that the answer is "YES" in step S22), and the likelihoods of the other defects are each lower than the associated threshold value. In this case, only data on the likelihood p1 of the defect 1 is stored in the array a [ ]. The determiner 23 thus determines in step S28 that the defect type is the "defect 1". Consequently, the determiner 23 is able to determine the single most likely defect type.

The determining procedure involves determining that the target product data Da is data on a non-defective product when the result of the comparison for each defect type indicates that the likelihoods (p1, . . . , pn) of a defective product for all defects are each lower than the associated defective product threshold value (t1, . . . , tn), which means that the answer is "NO" in steps S22 and S25, and the likelihood p0 of a non-defective product is equal to or greater than the non-defective product threshold value t0, which means that the answer is "YES" in step S30. In other words, when the likelihoods (p1, . . . , pn) of a defective product for all defects are each lower than the associated defective product threshold value (t1, . . . , tn) as a result of the comparison for each defect type, the target product data Da is unlikely to be data on a defective product having a known defect. When the likelihood p0 of a non-defective product is equal to or greater than the non-defective product threshold value t0, the target product data Da is likely to be data on a non-defective product. The determiner 23 is thus able to determine that the target product data Da in this case is data on a non-defective product.

Figure 5A:
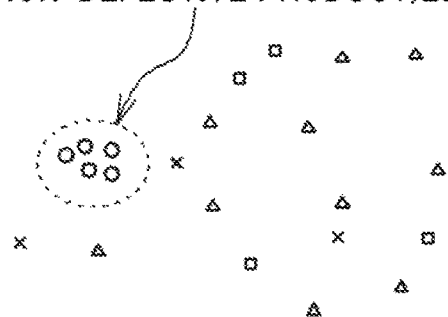
FIGS. 5A, 5B, and 5C are conceptual diagrams each illustrating a space representing features.
Figure 5B:
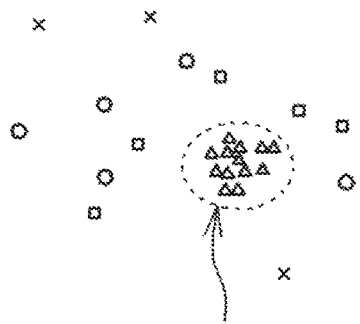
Figure 5C:
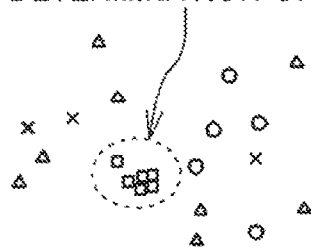

As described above, the learning procedure of the information processing method according to the present embodiment involves generating the defective product learning model for each defect type in addition to generating the non-defective product learning model. FIGS. 5A, 5B, and 5C are conceptual diagrams illustrating spaces representing features obtained by performing the learning procedure of the present, embodiment for non-defective product data and defective product data for each defect type. Generating the non defective product learning model by conducting machine learning (i.e., non-defective product learning) using non-defective product data as teacher data defines a determination boundary L0 in the space representing the features by which a non-defective product is to be determined. As illustrated in FIG. 5A, the determination boundary L0 is located close to the non-defective product data used for the learning, such that only the non-defective product data is present within the determination boundary L0. Generating the defective product learning model M1 by conducting machine learning i.e., defective product learning) using defective product data for the defect 1 as teacher data defines a determination boundary L1 in the space representing the features by which the defect 1 is to be determined. As illustrated in FIG. 5B, the determination boundary L1 is located close to the defective product data used for the learning, such that only the defective product data for the defect 1 is present within the determination boundary L1. Generating the defective product learning model Mn by conducting machine learning (i.e., defective product learning) using defective product data for the defect n as teacher data defines a determination boundary Ln in the space representing the features by which the defect n is to be determined. As illustrated in FIG. 5C, the determination boundary Ln is located close to the defective product data used for the learning, such that only the defective product data for the defect n is present within the determination boundary Ln. Thus, the determination boundary L0 (by which a non-defective product is to be determined), the determination boundary L1 (by which a defective product having the defect 1 is to be determined), and the determination boundary Ln (by which a defective product having the defect n is to be determined) are defined in the different spaces as illustrated in FIGS. 5A, 5B, and 5C.

Accordingly, the determiner 23 is able to determine in step S32 that the target product data Da is data on a defective product having an unknown defect when the likelihood of a non-defective product and the likelihood of a defective product for each defect type (which are calculated in the calculating procedure involving using the target product data Da as input data) satisfy the likelihood-related predetermined requirement. In other words, the determiner 23 determines that the product data Da is data on a defective product having an unknown defect when the features of the product data Da are present outside the determination boundary L0 in the space illustrated in FIG. 5A, the determination boundary L1 in the space illustrated in FIG. 5B, and the determination boundary Ln in the space illustrated in FIG. 5C.

Figure 6:
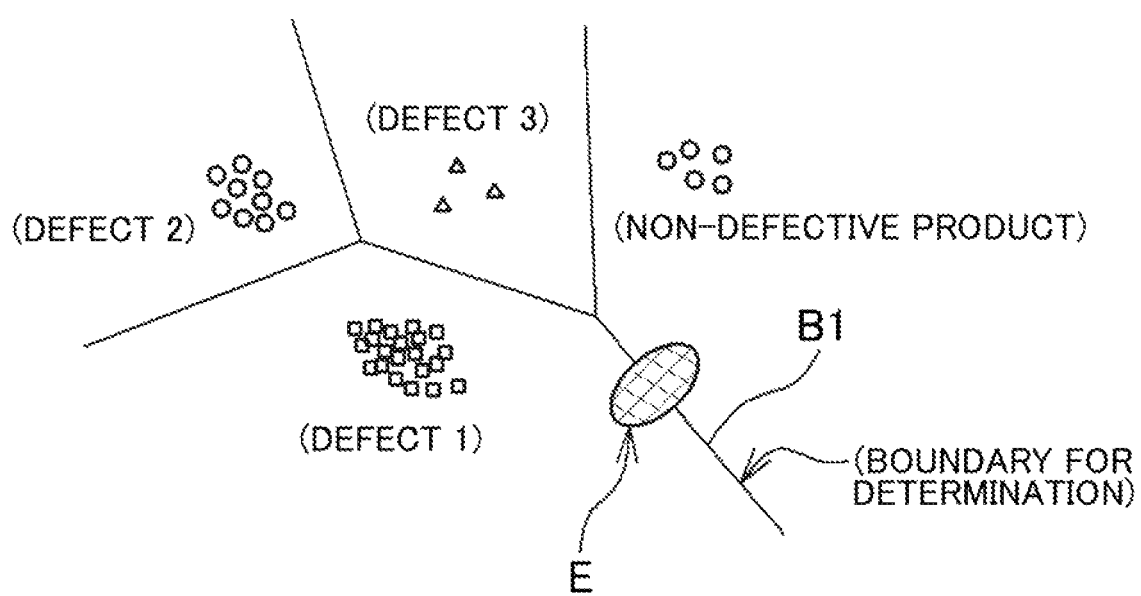
FIG. 6 is a conceptual diagram of an exemplary technique known in the related art, illustrating spaces that represent features.

The disadvantage of the information processing method known in the related art will be described again with reference to FIG. 6. Suppose that target product data is data on a defective product having an unknown defect (which is indicated by the arrow E), and the features of the target product data are more similar to the features of a non-detective product than to the features of the known defect 1, although the features of the known defect 1 differ from the features of a non-defective product. In such a case, the target product data that is actually defective product data is unfortunately determined to be non-defective product data. The information processing method according to the present embodiment, however, makes it possible to determine that the target product data Da is data on a defective product having an unknown defect when the target product data Da is data on a defective product having an unknown defect. The information processing method according to the present embodiment thus makes it possible to prevent a defective product from being determined to be a non-defective product.

As previously described with reference to FIG. 4, the determining procedure according to the present embodiment involves determining whether the likelihood (p1, . . . , pn) of a defective product, calculated for each defect type, satisfies the likelihood-related predetermined requirement, and then determining whether the likelihood p0 of a non-defective product satisfies the likelihood-related predetermined requirement. The information processing method according to the present embodiment thus makes it unlikely that the target product data Da, which is actually defective product data, will be determined to be non-defective product data.

The embodiment disclosed herein is not limitative but illustrative in all respects. The scope of the invention is not limited to the foregoing embodiment but embraces all changes and modifications that may fall within the scope of the claims and equivalents thereof. Target products are not limited to steering systems or rolling bearings but may be various other assemblies or mechanical parts. Product data is not limited to vibration data or image data but may be temperature data (or temperature variation data). The foregoing embodiment has been described on the assumption that the difference between product data (which is input data) and output data is defined as a determination value and the determination value is converted into a likelihood. Alternatively, the likelihood may be calculated in any other suitable manner.

The invention makes it possible to, when target product data includes data on a defective product having an unknown defect, determine that this data is data on a defective product having an unknown defect.

What is claimed is:

1. An information processing method comprising:
   a learning procedure involving generating a non-defective product learning model by conducting machine learning using non-defective product data as teacher data, and generating a defective product learning model for a plurality of defect types by conducting machine learning for each defect type using defective product data as teacher data;
   a calculating procedure involving calculating a probability of a non-defective product from output data calculated using the non-defective product learning model to which target product data is input, and calculating a probability of a defective product for each defect type from output data calculated using the defective product learning model to which the target product data is input; and
   a determining procedure involving determining that the target product data is data on a defective product having an unknown defect when the likelihoodprobability of a non-defective product and the probability of a defective product for each defect type calculated by the calculating procedure satisfy a probability-related standard.

2. The information processing method according to claim 1, wherein the determining procedure involves making a comparison between the probability of a non-defective product and a non-defective product threshold value, and making a comparison between the probability of a defective product and a defective product threshold value for each defect type, and
   the determining procedure involves determining that the target product data is data on a defective product having an unknown defect when the probabilities of a defective product for all defects are each lower than the associated defective product threshold value as a result of the comparison for each defect type and the probability of a non-defective product is lower than the non-defective product threshold value.

3. The information processing method according to claim 2, wherein the determining procedure involves, when the probabilities of a defective product are equal to or greater than the defective product threshold values for the plurality of the defect types as a result of the comparison for each defect type, determining that one of the defect types that maximizes a difference between the probability and the defective product threshold value is the defect type for the target product data.

4. The information processing method according to claim 2, wherein the determining procedure involves, when the probability of a defective product is equal to or greater than the associated defective product threshold value for one of the defect types as a result of the comparison for each defect type, determining that the target product data is data on a defective product having the one of the defect types.

5. The information processing method according to claim 2, wherein the determining procedure involves determining that the target product data is non-defective product data when the probabilities of a defective product for all defects are each lower than the associated defective product threshold value as a result of the comparison for each defect type and the probability of a non-defective product is equal to or greater than the non-defective product threshold value.

6. The information processing method according to claim 1, wherein the determining procedure involves determining whether the probability of a defective product calculated for each defect type satisfies the probability-related standard, and then determining whether the probability of a non-defective product satisfies the probability-related standard.

7. An information processing apparatus comprising:
   a learner configured to generate a non-defective product learning model by conducting machine learning using non-defective product data as teacher data, and configured to generate a defective product learning model for a plurality of defect types by conducting machine learning for each defect type using defective product data as teacher data;
   a calculator configured to calculate a probability of a non-defective product from output data calculated using the non-defective product learning model to which target product data is input, and configured to calculate a probability of a defective product for each defect type from output data calculated using the defective product learning model to which the target product data is input; and
   a determiner configured to determine that the target product data is data on a defective product having an unknown defect when the probability of a non-defective product and the probability of a defective product for each defect type calculated by the calculator satisfy a probability-related standard.

8. A non-transitory computer readable medium that stores a program that when executed, causes a computer to function as:
   a learner configured to generate a non-defective product learning model by conducting machine learning using non-defective product data as teacher data, and configured to generate a defective product learning model for a plurality of defect types by conducting machine learning for each defect type using defective product data as teacher data;
   a calculator configured to calculate a probability of a non-defective product from output data calculated using the non-defective product learning model to which target product data is input, and configured to calculate a probability of a defective product for each defect type from output data calculated using the defective product learning model to which the target product data is input; and
   a determiner configured to determine that the target product data is data on a defective product having an unknown defect when the probability of a non-defective product and the probability of a defective product for each defect type calculated by the calculator satisfy a probability-related standard.

9. The information processing method according to claim 1, wherein the machine learning used for generating the non-defective product learning model and generating the defective product learning model is implemented with a variational auto-encoder learning model.

10. The information processing apparatus according to claim 7, wherein the machine learning used for generating the non-defective product learning model and generating the defective product learning model is implemented with a variational auto-encoder learning model.

11. The non-transitory computer readable medium according to claim 8, wherein the machine learning used for generating the non-defective product learning model and generating the defective product learning model is implemented with a variational auto-encoder learning model.

\* \* \* \* \*